US012776839B2

(12) United States Patent
Imai et al.

(10) Patent No.: US 12,776,839 B2
(45) Date of Patent: Oct. 27, 2026

(54) MOBILES, COMMUNICATION SYSTEMS, AND CONTROL METHODS

(71) Applicant: NTT, Inc., Tokyo (JP)

(72) Inventors: Takeshi Imai, Musashino (JP); Naotaka Shibata, Musashino (JP); Shin Kaneko, Musashino (JP)

(73) Assignee: NTT, Inc., Tokyo (JP)

( * ) Notice: Subject to any disclaimer, the term of this patent is extended or adjusted under 35 U.S.C. 154(b) by 249 days.

(21) Appl. No.: 18/704,126

(22) PCT Filed: Oct. 27, 2021

(86) PCT No.: PCT/JP2021/039662
§ 371 (c)(1),
(2) Date: Apr. 24, 2024

(87) PCT Pub. No.: WO2023/073834
PCT Pub. Date: May 4, 2023

(65) Prior Publication Data
US 2024/0421904 A1 Dec. 19, 2024

(51) Int. Cl.
*H04B 10/112* (2013.01)
*H04B 10/50* (2013.01)

(52) U.S. Cl.
CPC ........... *H04B 10/112* (2013.01); *H04B 10/50* (2013.01)

(58) Field of Classification Search
CPC ........... G01N 15/02; G01N 2015/0092; H04B 10/112; H04B 10/50
See application file for complete search history.

(56) References Cited

U.S. PATENT DOCUMENTS 5,060,304 A * 10/1991 Solinsky ............ H04B 10/1127 356/141.3
5,142,400 A * 8/1992 Solinsky ............ H04B 10/1127 356/139.05
(Continued)

FOREIGN PATENT DOCUMENTS

JP H10-322772 A 12/1998
JP 2014220676 A * 11/2014
(Continued)

OTHER PUBLICATIONS

McGarry, NASA Goddard Space Flight Center (Year: 1998).*

*Primary Examiner* — David C Payne
*Assistant Examiner* — Mohammed Abdelraheem
(74) *Attorney, Agent, or Firm* — Harness, Dickey & Pierce, P.L.C.

(57) ABSTRACT

An aspect of the present invention is a mobile including an optical transmitter that transmits an optical signal by irradiating a light receiver of a reception device with a beam, an instruction receiver that receives a movement instruction to move the mobile to a designated position, a position acquirer that acquires a current position of the mobile, a direction acquirer that acquires a moving direction from the current position to the designated position, and a beam controller that performs change control of changing an irradiation direction of a beam according to the moving direction within a range in which the beam is emitted to the light receiver before the mobile starts to move toward the designated position.

9 Claims, 11 Drawing Sheets

(56) References Cited

U.S. PATENT DOCUMENTS 5,517,016 A * 5/1996 Lesh .................... G01B 11/272 356/152.2
6,097,481 A * 8/2000 Coffey ...................... F41G 5/08 356/139.05
6,590,685 B1 * 7/2003 Mendenhall ............ G01S 3/786 398/131
6,970,651 B1 * 11/2005 Schuster ............ H04B 10/1121 398/118
7,343,099 B2 * 3/2008 Wirth ..................... G02B 26/06 398/131
7,602,480 B2 * 10/2009 Romain ............... G01C 21/005 356/139.01
7,609,972 B2 * 10/2009 Cunningham ..... H04B 10/1127 398/118
8,160,452 B1 * 4/2012 Tidwell ................ H04B 10/118 398/139
8,634,974 B2 * 1/2014 DeVaul .............. H04B 10/1129 398/118
9,057,604 B1 * 6/2015 Fink ........................ G01S 7/497
9,800,332 B2 * 10/2017 Chalfant, III .......... G02B 13/22
2010/0004798 A1 * 1/2010 Bodin ...................... G01S 19/14 701/25
2012/0230701 A1 * 9/2012 Murata .............. H04B 10/1123 398/140
2013/0070239 A1 * 3/2013 Crawford ................ F41G 7/001 356/139.04
2014/0049643 A1 * 2/2014 Segerstrom ............ B64U 20/87 250/234
2018/0088576 A1 * 3/2018 Kong .................... B60W 30/00

FOREIGN PATENT DOCUMENTS

KR 20040055430 A * 6/2004 ............... G06T 5/00
WO WO-2017087320 A1 * 5/2017 ............. E21B 33/06

* cited by examiner

MOBILES, COMMUNICATION SYSTEMS, AND CONTROL METHODS

CROSS-REFERENCE TO RELATED APPLICATIONS

This application is a 371 U.S. National Phase of International Application No. PCT/JP2021/039662, filed on Oct. 27, 2021. The entire disclosure of the above application is incorporated herein by reference.

TECHNICAL FIELD

The present invention relates to a technology of mobiles, communication systems, and control methods.

BACKGROUND ART

As a technique related to optical spatial communication, Patent Literature 1 discloses that an optical receiver capable of swinging is directed in a direction in which signal light can be received most strongly, or communication is continued using an optical receiver that receives signal light most strongly among a plurality of optical receivers provided.

CITATION LIST

Patent Literature

Patent Literature 1: JP H10-322772 A

SUMMARY OF INVENTION

Technical Problem

In general, in a case where a laser is used for signal light to increase the speed of a signal, not only the directivity of the optical receiver but also the directivity of the optical transmitter becomes sharp, and it becomes difficult to mutually direct in a case where transmission and reception are performed. For example, in a case of performing communication with an artificial satellite, since the orbit of the artificial satellite is given in advance, it is easy to direct the transmitter/receiver. On the other hand, in the case of a mobile such as a remotely-controlled unmanned flying object having no predetermined trajectory, it is not easy to direct the transmitter/receiver.

This will be specifically described with reference to FIGS. 12A, 12B, 12C, 13A, 13B, and 13C. FIGS. 12A, 12B, and 12C are diagrams of a receiver viewed from the front. FIGS. 13A, 13B, and 13C are diagrams of a mobile and a receiver viewed from above. In these drawings, the beam diameter is larger than that of the receiver, but the beam diameter may be smaller than that of the receiver. The receiver is fixed. Therefore, the mobile controls the irradiation direction of the beam.

FIGS. 12A and 13A are diagrams illustrating a state in which the receiver is included in the beam diameter. It is assumed that the mobile moves rightward from the state illustrated in FIGS. 12A and 13A. At this time, in a case where the movement amount is large and the start of the tracking operation on the mobile side is slow, as illustrated in FIGS. 12B and 13B, since the tracking mechanism does not sufficiently operate, the beam diameter is largely shifted to the right and deviated from the receiver. Accordingly, communication is interrupted.

Thereafter, when the tracking operation in the mobile starts to move and becomes fast enough to perform tracking, the receiver can catch up with the movement of the mobile and put the receiver into the beam diameter again as illustrated in FIGS. 12C and 13C.

Note that, in FIGS. 12 and 13, the mobile controls the irradiation direction of the beam, but in general, the reception side also adjusts the direction of the receiver to direct the mobile. In addition, the mobile receives the beam by radiating the beam from the reception side. In such a case, the reception side performs a similar beam tracking operation.

As described above, when the light receiver deviates from the beam diameter, communication is interrupted, and thus it is difficult to perform stable communication.

In view of the above circumstances, an object of the present invention is to provide a technology capable of realizing more stable optical spatial communication.

Solution to Problem

An aspect of the present invention is a mobile including an optical transmitter that transmits an optical signal by irradiating a light receiver of a reception device with a beam, an instruction receiver that receives a movement instruction to move the mobile to a designated position, a position acquirer that acquires a current position of the mobile, a direction acquirer that acquires a moving direction from the current position to the designated position, and a beam controller that performs change control of changing an irradiation direction of a beam according to the moving direction within a range in which the light receiver is irradiated with the beam before the mobile starts to move toward the designated position.

An aspect of the present invention is a communication system including a mobile, and a reception device that receives a beam emitted from the mobile, in which the mobile includes an optical transmitter that transmits an optical signal by irradiating a light receiver of the reception device with a beam, a first instruction receiver that receives a movement instruction to move the mobile to a designated position, a first position acquirer that acquires a current position of the mobile, a first direction acquirer that acquires a moving direction from the current position to the designated position, and a beam controller that performs change control of changing an irradiation direction of a beam according to the moving direction acquired by the first direction acquirer within a range in which the light receiver is irradiated with the beam before the mobile starts to move toward the designated position, and the reception device includes a second instruction receiver that receives the movement instruction, and a light reception controller that performs change control of changing an orientation direction of the light receiver according to the movement instruction received by the second instruction receiver.

An aspect of the present invention is a control method of a mobile including an optical transmitter that transmits an optical signal by irradiating a reception device that receives a beam irradiated from a mobile with a beam, the method including an reception step of receiving a movement instruction to move the mobile to a designated position, a position acquisition step of acquiring a current position of the mobile, a direction acquisition step of acquiring a moving direction from the current position to the designated position, and a beam control step of performing change control of changing an irradiation direction of a beam according to the moving direction within a range in which the beam is emitted to the reception device before the mobile starts to move toward the designated position.

Advantageous Effects of Invention

According to the present invention, more stable optical spatial communication can be realized.

DESCRIPTION OF EMBODIMENTS

An embodiment of the present invention will be described in detail with reference to the drawings.

Figure 1:
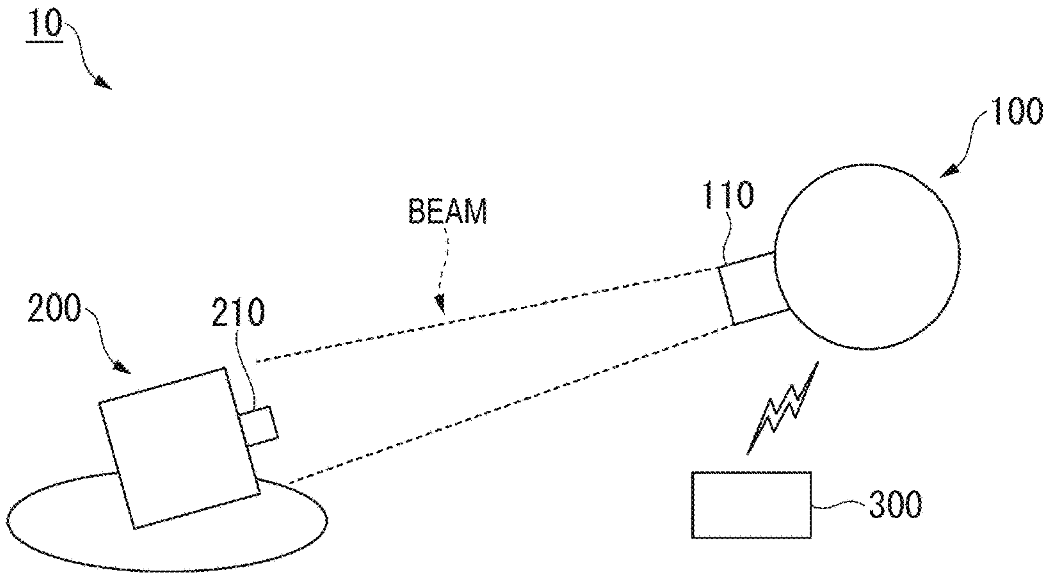
FIG. 1 is a diagram illustrating a configuration example of a communication system.

FIG. 1 is a diagram illustrating a configuration example of a communication system 10 according to an embodiment. This configuration example illustrates a configuration example common to each Embodiments 1 to 4 described below. The communication system 10 includes a mobile 100 and a fixed station 200. FIG. 1 also illustrates a flight control device 300.

The mobile 100 is, for example, a remote-piloted unmanned flying object such as a drone, but may be any object as long as it moves. The mobile 100 includes an optical signal transmitter and receiver 110. The optical signal transmitter and receiver 110 transmits an optical signal by radiating a beam. In the present embodiment, not only transmission but also reception of an optical signal is possible. Therefore, the optical signal transmitter and receiver 110 transmits a beam to the fixed station 200 or receives a beam from the fixed station 200. The optical signal transmitter and receiver 110 can change the orientation. That is, the irradiation direction of the beam can be changed. Further, the optical signal transmitter and receiver 110 measures a positional deviation with respect to the light receiver that receives the beam emitted from the fixed station 200, and outputs the positional deviation to the beam controller 124.

The flight control device 300 operates the mobile 100 by transmitting a movement instruction to the mobile 100. The movement instruction is an instruction to move the mobile 100 to the designated position. In the first embodiment, only the mobile 100 receives the movement instruction, but in the embodiments other than the first embodiment, the fixed station 200 can also receive the movement instruction. The designated position is designated by, for example, the east longitude, the north latitude, the altitude, and the like. Communication between the flight control device 300 and the mobile 100 or communication between the flight control device 300 and the fixed station is communication using radio waves or visible light including or infrared light.

The fixed station 200 includes an optical signal transmitter and receiver 210. The optical signal transmitter and receiver 210 transmits a beam to the mobile 100 and receives a beam from the mobile 100. The fixed station 200 may be configured to perform only reception without having a function of transmitting a beam. In each embodiment, the fixed station 200 does not move, but the optical signal transmitter and receiver 210 can change the orientation in an embodiment other than the first embodiment.

Figure 2A:
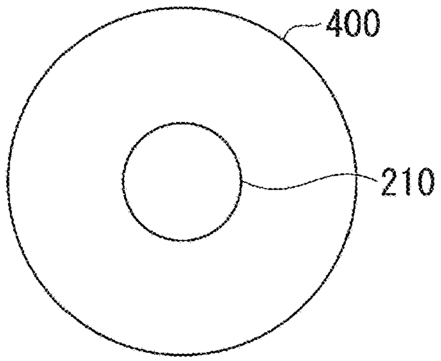
FIG. 2A is a front view of an optical signal transmitter and receiver.
Figure 2B:
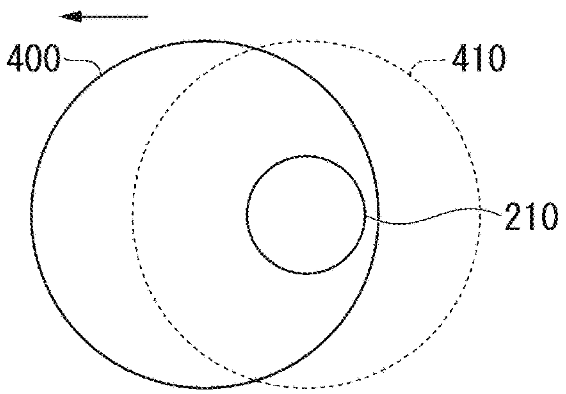
FIG. 2B is a front view of the optical signal transmitter and receiver.
Figure 2C:
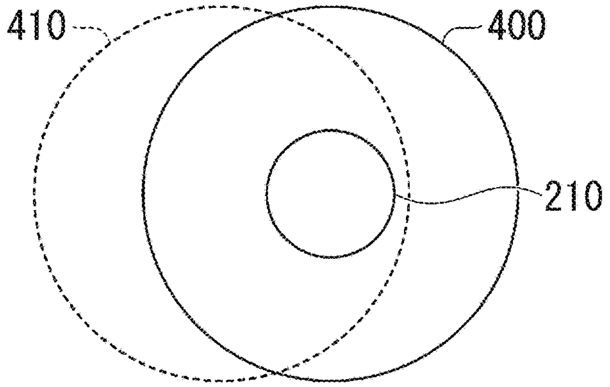
FIG. 2C is a front view of the optical signal transmitter and receiver.
Figure 3A:
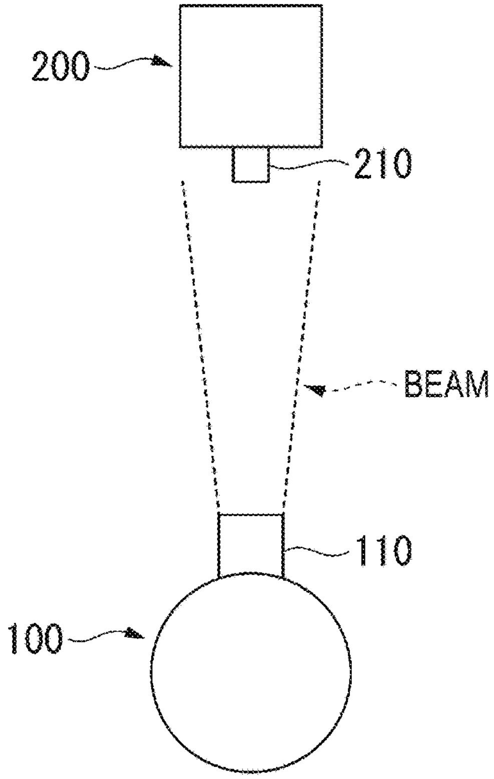
FIG. 3A is a diagram of a mobile and the optical signal transmitter and receiver as viewed from above.
Figure 3B:
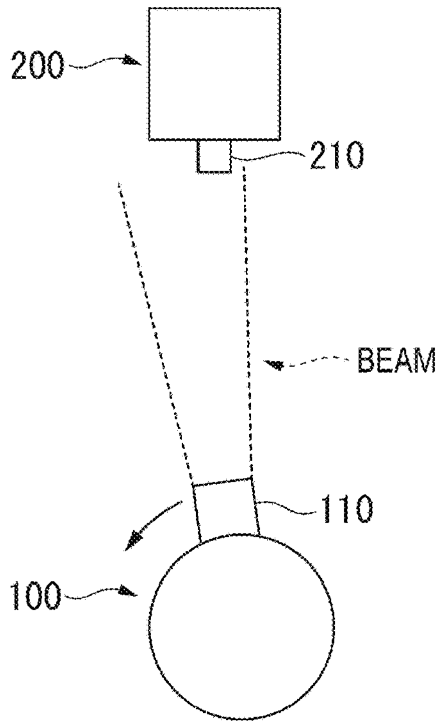
FIG. 3B is a diagram of the mobile and the optical signal transmitter and receiver as viewed from above.
Figure 3C:
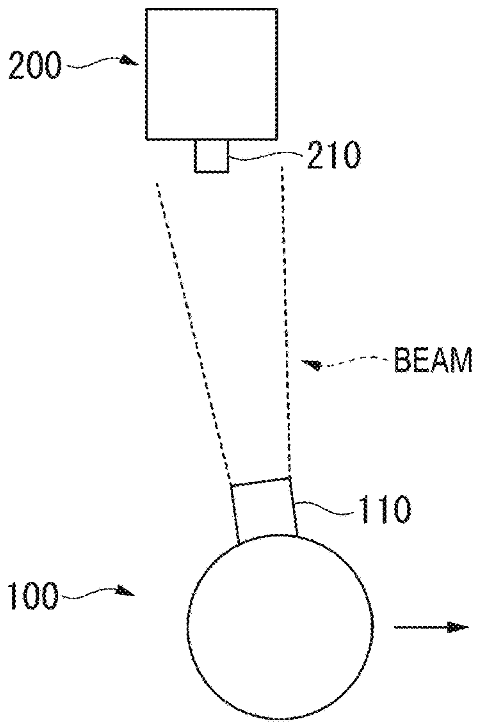
FIG. 3C is a diagram of the mobile and the optical signal transmitter and receiver as viewed from above.

Next, control contents common to the embodiments will be described. FIGS. 2A, 2B, and 2C are diagrams of the optical signal transmitter and receiver 210 as viewed from the front. FIGS. 3A, 3B, and 3C are diagrams of the mobile 100 and the optical signal transmitter and receiver 210 as viewed from above. In these drawings, the beam diameter is larger than that of the optical signal transmitter and receiver 210, but the beam diameter may be smaller than that of the optical signal transmitter and receiver 210.

FIGS. 2A and 3A are diagrams illustrating a state in which the optical signal transmitter and receiver 210 is included in the beam diameter. In the state illustrated in FIGS. 2A and 3A, it is assumed that the flight control device 300 transmits a movement instruction to move to a designated position in the right direction of the mobile 100 to the mobile 100. At this time, the mobile 100 acquires the current position and acquires the moving direction from the current position to the designated position. The moving direction in the case of FIGS. 2 and 3 is the right direction as described above.

The mobile 100 changes the irradiation direction of the beam according to the moving direction within a range in which the optical signal transmitter and receiver 210 is irradiated with the beam. Specifically, as illustrated in FIG. 2B, the mobile 100 performs change control to change the irradiation direction in a direction opposite to the moving direction (here, the left direction) as illustrated in FIG. 3B within a range where the optical signal transmitter and receiver 210 is irradiated with the beam. As illustrated in FIG. 3C, the mobile 100 moves the mobile 100 toward the designated position after the change control is started (for example, after a predetermined delay time has elapsed from the start of the change control). At this time, as illustrated in FIG. 2C, since the change control has been started, it is possible to prevent the optical signal transmitter and receiver 210 from deviating from the beam diameter, and thus, it is possible to realize more stable optical space communication.

As described above, in the present embodiment, by performing the change control to change the irradiation direction before the mobile 100 moves, a time until tracking can be made to spare. With this margin, it is possible to suppress the optical signal transmitter and receiver 210 from deviating from the beam diameter as compared with the prior art, and thus, it is possible to realize more stable optical space communication.

Note that, as the movement instruction, an instruction to change the posture of the mobile 100 may be provided in addition to the movement to the designated position. The instruction to change the posture is, for example, an instruction to rotate rightward by 90 degrees. Even with such an instruction, by performing change control to change the irradiation direction before the mobile 100 rotates, a time until tracking can be made to spare.

Based on the above, each embodiment will be described. In the following embodiment, a description of a configuration corresponding to an existing reference sign may be omitted. Furthermore, in each embodiment, an example in which an optical signal is transmitted from the mobile 100 to the fixed station 200 will be described, but in each embodiment, an optical signal can also be transmitted from the fixed station 200 to the mobile 100.

First Embodiment

In the first embodiment, as described above, only the mobile 100 receives the movement instruction of the flight control device 300. In addition, the change control of the orientation of the optical signal transmitter and receiver 210 of the fixed station 200 is not performed.

Figure 4:
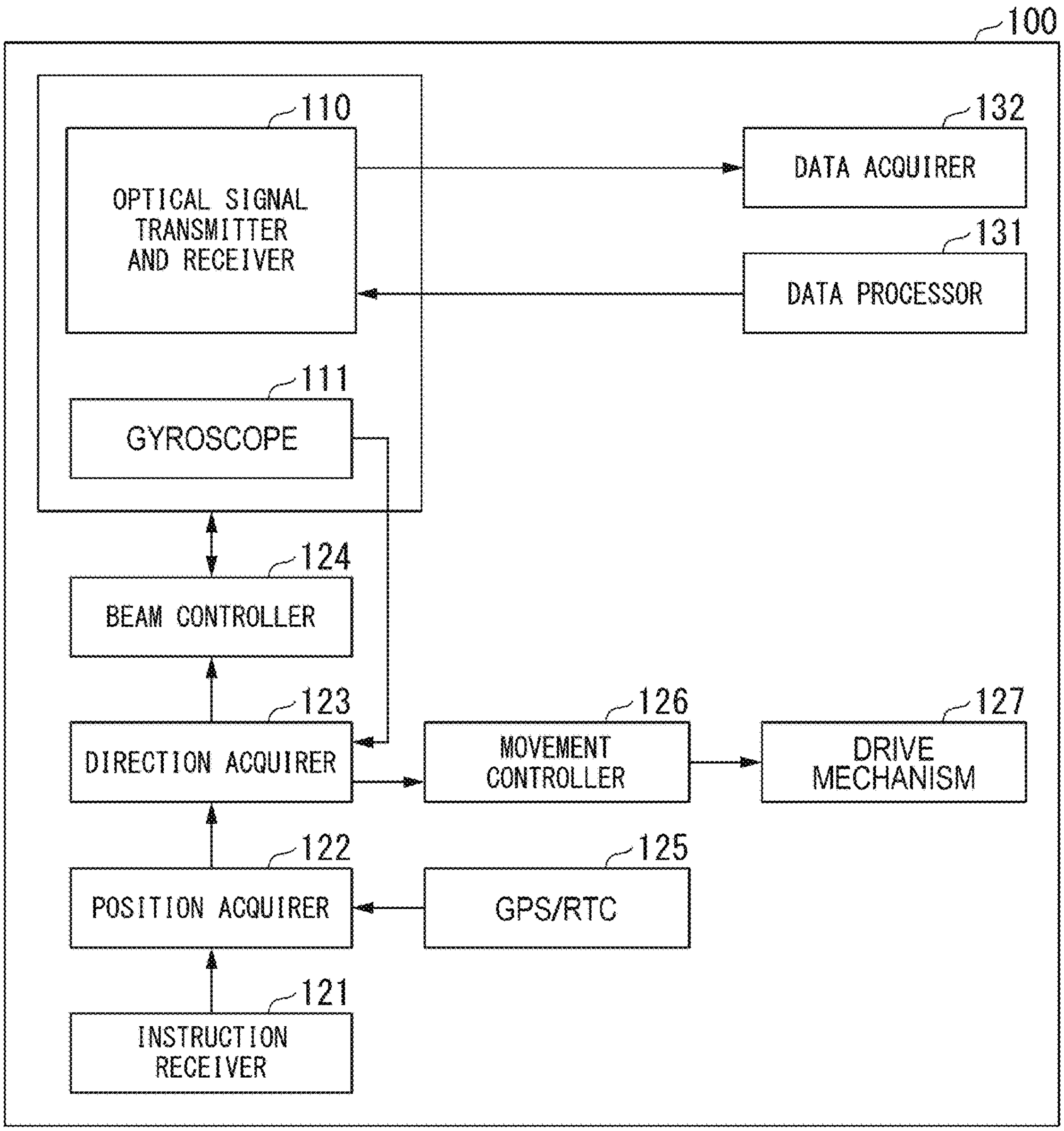
FIG. 4 is a diagram illustrating a configuration example of a mobile according to a first embodiment.

FIG. 4 is a diagram illustrating a configuration example of the mobile 100 in the first embodiment. The mobile 100 includes the optical signal transmitter and receiver 110 and a gyroscope 111. The gyroscope 111 is configured integrally with the optical signal transmitter and receiver 110, detects a posture (roll, pitch, yaw) of the optical signal transmitter and receiver 110, and outputs the posture to the direction acquirer 123 as posture information.

In addition, the mobile 100 includes a data processor 131 and a data acquirer 132. The data processor 131 processes data to be transmitted and outputs the processed data to the optical signal transmitter and receiver 110. The optical signal transmitter and receiver 110 transmits an optical signal by irradiating the light receiver of the optical signal transmitter and receiver of the fixed station 200 with a beam based on the data output from the data processor 131. The optical signal transmitter and receiver 110 is an example of an optical transmitter. The data acquirer 132 acquires data received by the optical signal transmitter and receiver 110.

Furthermore, the mobile 100 further includes an instruction receiver 121, a position acquirer 122, a direction acquirer 123, a beam controller 124, a GPS/RTC 125, a movement controller 126, and a drive mechanism 127. The instruction receiver 121 receives the movement instruction from the flight control device 300, and outputs the movement instruction to the position acquirer 122. The position acquirer 122 acquires the current position and the current time from the GPS/RTC 125, and outputs the current position and the current time to the direction acquirer 123 together with a movement instruction. The GPS/RTC 125 includes a global positioning system (GPS) and a real time clock (RTC).

The direction acquirer 123 acquires the moving direction from the current position to the designated position, and outputs the acquired moving direction to the beam controller 124. Further, the direction acquirer 123 outputs the designated position to the movement controller 126. Note that the direction acquirer 123 acquires the moving direction in consideration of the posture information from the gyroscope 111. Before the mobile 100 starts moving toward the designated position, the beam controller 124 performs change control to change the beam irradiation direction according to the moving direction within a range in which the optical signal transmitter and receiver 210 of the fixed station 200 is irradiated with the beam. In addition, the beam controller 124 acquires the irradiation position of the beam transmitted by the optical signal transmitter and receiver 110, and performs tracking control to cause the optical signal transmitter and receiver 210 of the fixed station 200 to be irradiated with the beam.

The movement controller 126 causes the drive mechanism 127 to move the mobile 100 toward the designated position after the change control is started by the beam controller 124. The drive mechanism 127 is a mechanism for moving the mobile 100. When the mobile 100 is a drone, it is a propeller or the like.

The movement controller 126 described above moves the mobile 100 toward the designated position after a predetermined delay time has elapsed from the start of the change control. Examples of the delay time include a time from the start of tracking control to stabilization at a desired moving speed. This time is measured in advance. Note that the delay time may vary depending on the magnitude of the amount of change in the current position or posture.

Figure 5:
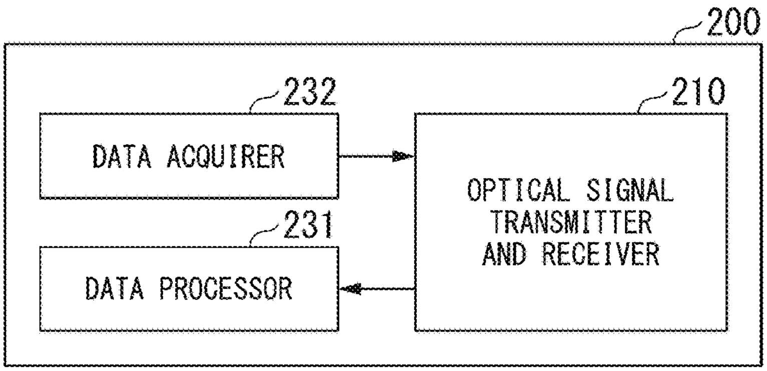
FIG. 5 is a diagram illustrating a configuration example of a fixed station according to the first embodiment.

FIG. 5 is a diagram illustrating a configuration example of the fixed station 200 according to the first embodiment. The fixed station 200 includes the optical signal transmitter and receiver 210, a data processor 231, and a data acquirer 232. The optical signal transmitter and receiver 210 includes a light receiver such as a light reception window, and receives an optical signal by receiving a beam emitted from the mobile 100. The data acquirer 232 acquires data received by the optical signal transmitter and receiver 210. The data processor 231 processes data to be transmitted and outputs the processed data to the optical signal transmitter and receiver 210. The optical signal transmitter and receiver 210 transmits an optical signal based on the data output from the data processor 231.

Figure 6:
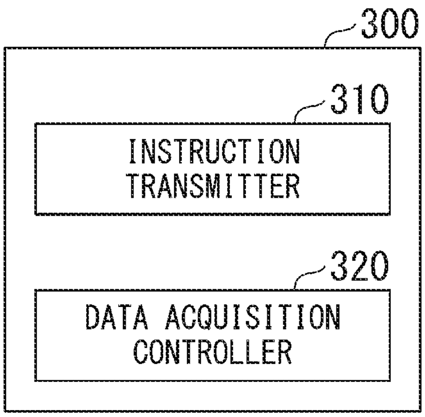
FIG. 6 is a diagram illustrating a configuration example of a flight control device according to the first embodiment.

FIG. 6 is a diagram illustrating a configuration example of a flight control device 300 according to the first embodiment. The flight control device 300 includes an instruction transmitter 310 and a data acquisition controller 320. The instruction transmitter 310 transmits a movement instruction to the mobile 100 based on an operation of an operator on an operation mechanism (not illustrated). The data acquisition controller 320 controls the data acquirer 132 of the mobile 100. In the following embodiments, the flight control device 300 has the same configuration as the configuration of FIG. 6 except that the movement instruction is also transmitted to the fixed station 200.

As described above, in the first embodiment, the change control is performed before the mobile 100 starts to move toward the designated position. Then, after a predetermined delay time has elapsed from the start of the change control, the mobile 100 is moved toward the designated position. Since the delay time is set to a time from the start of tracking control to stabilization at a desired moving speed, it is possible to suppress deviation of the optical signal transmitter and receiver 210 from the beam diameter as compared with the prior art, and thus, it is possible to realize more stable optical space communication.

Second Embodiment

A second embodiment is a mode in which the optical signal transmitter and receiver 210 of the fixed station 200 can track the mobile 100 in the configuration of the first embodiment. Further, the fixed station 200 is also configured to receive a movement instruction transmitted from the flight control device 300 to the mobile 100. As a result, since the fixed station 200 can also know the movement instruction, the future position of the mobile 100 can be ascertained. As a result, as compared with a case where the future position of the mobile 100 cannot be ascertained, the optical signal transmitter and receiver 210 of the fixed station 200 can track the mobile 100, and thus, as compared with the prior art, it is possible to suppress the optical signal transmitter and receiver 210 from deviating from the beam diameter, and thus, it is possible to realize more stable optical space communication.

Figure 7:
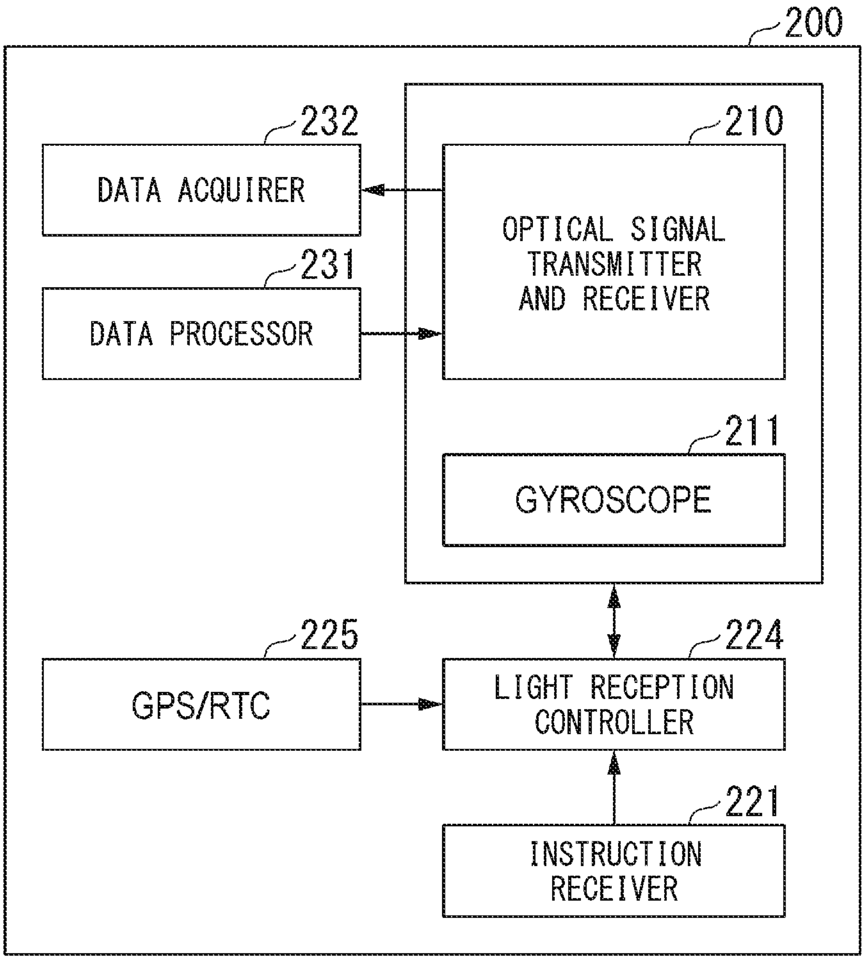
FIG. 7 is a diagram illustrating a configuration example of a fixed station according to a second embodiment.

The communication system 10 in the second embodiment is different from that in the first embodiment only in the configuration of the fixed station 200 as described above. FIG. 7 is a diagram illustrating a configuration example of the fixed station 200 according to the second embodiment. As illustrated in FIG. 7, in the second embodiment, the fixed station 200 includes a gyroscope 211, an instruction receiver 221, a light reception controller 224, and a GPS/RTC 225.

Note that the instruction receiver 121 of the configuration of the mobile 100 illustrated in FIG. 4 corresponds to the first instruction receiver in the second embodiment. The position acquirer 122 corresponds to a first position acquirer. The direction acquirer 123 corresponds to a first direction acquirer. Further, in the configuration illustrated in FIG. 7, the instruction receiver 221 corresponds to a second instruction receiver.

The optical signal transmitter and receiver 210 measures a positional deviation (positional deviation amount) with respect to the light receiver that receives the beam emitted from the mobile 100, and outputs the positional deviation to the beam controller 124. The gyroscope 211 outputs posture information of the optical signal transmitter and receiver 210 to the light reception controller 224. The instruction receiver 121 receives the movement instruction from the flight control device 300, and outputs the movement instruction to the light reception controller 224. The light reception controller 224 acquires the position of the fixed station 200 and the current time from the GPS/RTC 225.

The light reception controller 224 performs change control to change the orientation direction of the optical signal transmitter and receiver 210 according to the orientation information, the movement instruction, the position of the fixed station, and the positional displacement amount. As a change control example, the light reception controller 224 holds a designated position indicated by a movement instruction received one time before. Then, the light reception controller 224 obtains the movement route of the mobile 100 with respect to the fixed station 200 from the held designated position, the designated position indicated by the movement instruction received this time, and the position of the fixed station 200. The light reception controller 224 performs control to perform tracking along the route obtained using the positional displacement amount and the orientation information.

In this way, the fixed station 200 can suppress the optical signal transmitter and receiver 210 from deviating from the beam diameter as compared with a case where the instruction information is not received, and thus, more stable optical space communication can be realized. Further, similarly to the first embodiment, the change control is performed before the mobile 100 starts to move toward the designated position, and the mobile 100 is moved toward the designated position after the predetermined delay time elapses from the start of the change control. Therefore, it is possible to suppress the optical signal transmitter and receiver 210 from deviating from the beam diameter as compared with the prior art, and it is possible to realize more stable optical space communication.

Third Embodiment

The third embodiment is a mode in which the fixed station 200 acquires the current position from the mobile 100 in the configuration of the second embodiment. In the third embodiment, the position acquirer 122 of the mobile 100 notifies the fixed station 200 of the acquired current position and the current time at that time.

Figure 8:
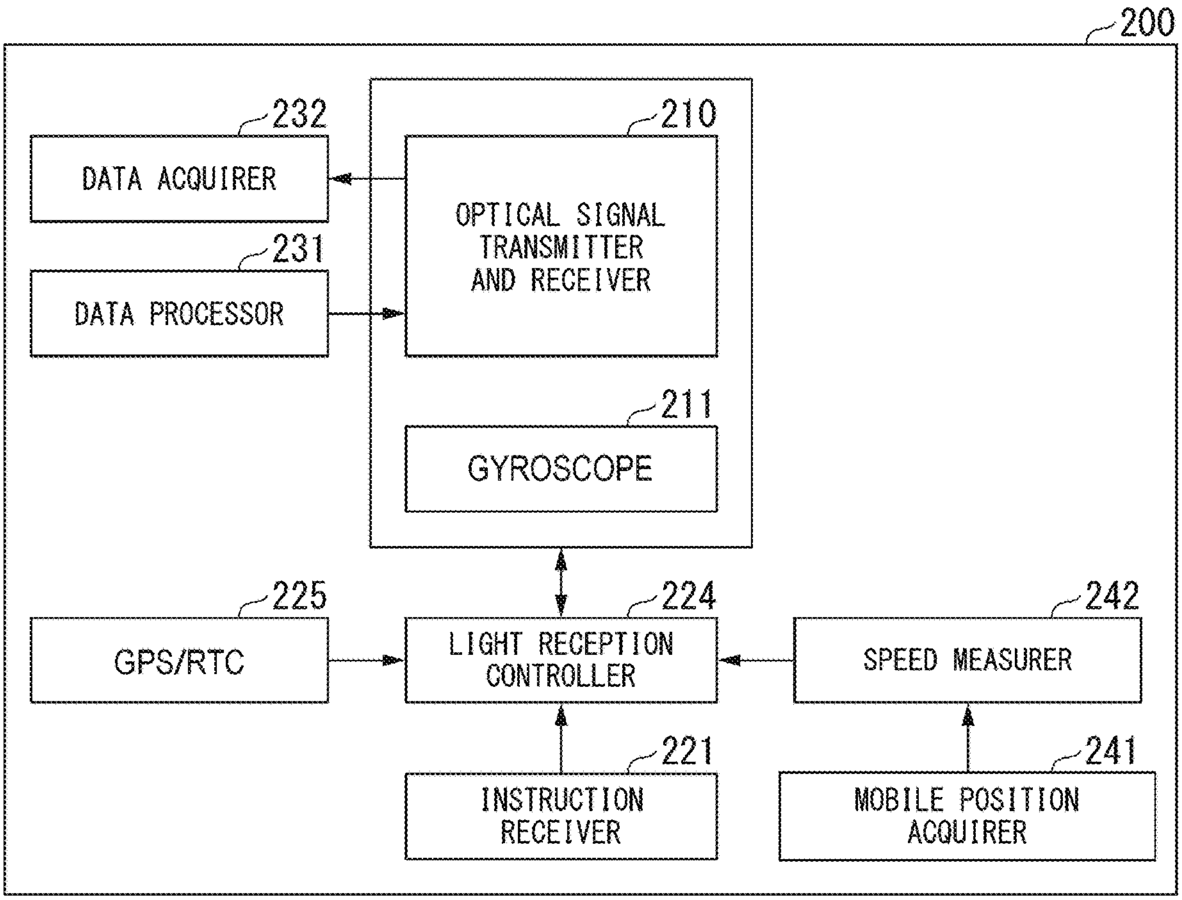
FIG. 8 is a diagram illustrating a configuration example of a fixed station according to a third embodiment.

The communication system 10 according to the third embodiment is different from that of the second embodiment in that the mobile 100 notifies the current position and in that the fixed station 200 is configured. FIG. 8 is a diagram illustrating a configuration example of the fixed station 200 according to the third embodiment. As illustrated in FIG. 8, in the third embodiment, the fixed station 200 includes a mobile position acquirer 241 and a speed measurer 242 in addition to the configuration of the second embodiment.

The mobile position acquirer 241 acquires the current position and the current time at that time from the position acquirer 122 of the mobile 100 a plurality of times, and outputs the current position and the current time to the speed measurer 242. The mobile position acquirer 241 corresponds to a current position acquirer. For example, the mobile position acquirer 241 acquires the current position and the current time at that time a plurality of times in a time period sufficiently shorter than the time required for the mobile 100 to move.

For example, the mobile 100 transmits a combination (P, T) of the position P of the mobile 100 and the time T when the position is measured to the fixed station 200. The fixed station 200 receives the (P, T), and the mobile position acquirer 241 analyzes the (P, T), and the time at this time is set as t. Note that the RTC used in the present embodiment is a highly accurate RTC capable of measuring the time difference between T and t. Since the time t is later than the time T, the fixed station 200 can recognize only the position where the mobile was at the time T slightly before.

Therefore, the mobile 100 transmits, to the fixed station 200, a combination Ak=(Pk, Tk) of the position Pk (k is a natural number) of the mobile 100 and the time Tk when the position is measured. As a result, the fixed station 200 can acquire a plurality of Aks (k=1, 2, . . . ). It is assumed that tk is a time when the fixed station 200 receives Ak and the mobile position acquirer 241 analyzes (P, T). The fixed station 200 obtains a speed v of the mobile 100 from the plurality of Aks.

When the fixed station 200 receives Ak up to k=n and the estimated position of the mobile 100 at the next k=n+1 is p, the estimated position p is obtained by calculating Pn+v×

(tn−Tn). In this way, it is possible to reduce an error caused by a difference between the time when the mobile 100 acquires the position and the time when the fixed station 200 receives the position from the mobile 100 and analyzes the position as much as possible.

As described above, by the fixed station 200 estimating the position of the mobile 100, it is possible to suppress the optical signal transmitter and receiver 210 from deviating from the beam diameter as compared with a case where the position is not estimated, and thus, it is possible to realize more stable optical space communication. Further, similarly to the first embodiment, the change control is performed before the mobile 100 starts to move toward the designated position, and the mobile 100 is moved toward the designated position after the predetermined delay time elapses from the start of the change control. Therefore, it is possible to suppress the optical signal transmitter and receiver 210 from deviating from the beam diameter as compared with the prior art, and it is possible to realize more stable optical space communication.

Furthermore, even in a case where there is movement of the mobile 100 not intended by the operator of the flight control device 300 due to disturbance such as vibration or strong wind, that is, even when there is movement of the mobile 100 that cannot be known by instruction information, the fixed station 200 can know the current position of the mobile 100, so that the optical signal transmitter and receiver 210 can easily track the mobile 100.

Fourth Embodiment

Figure 9:
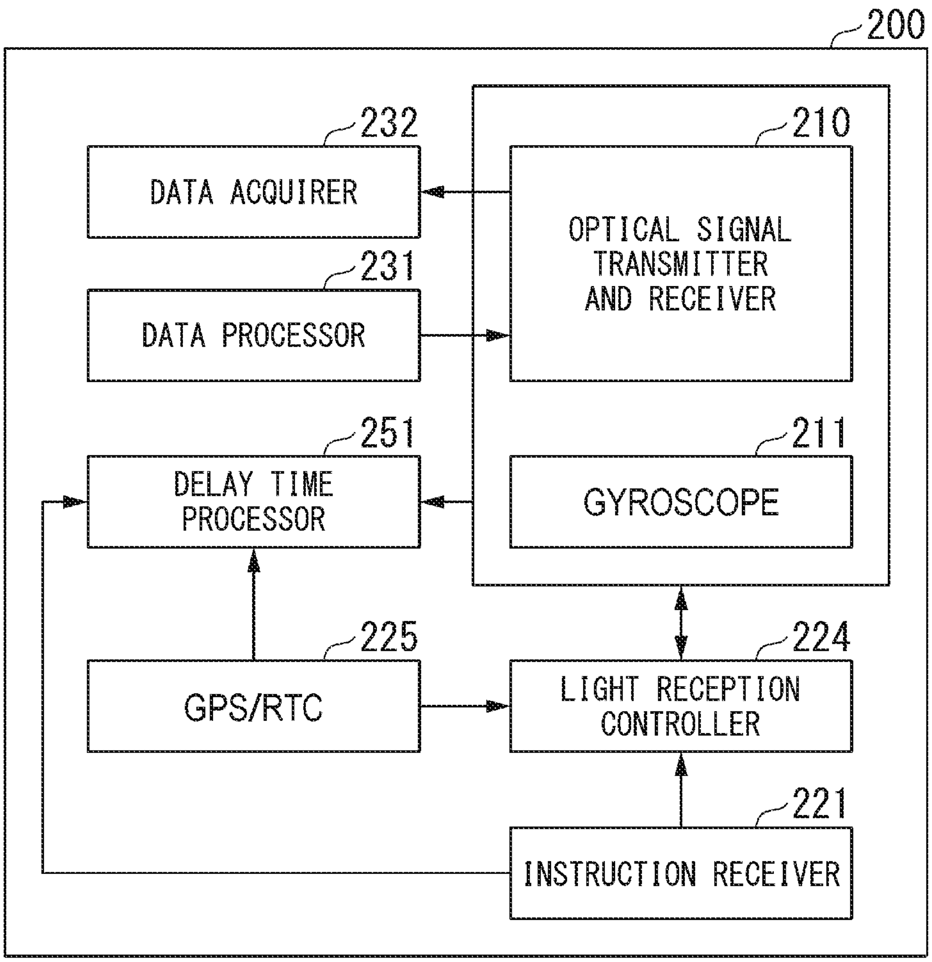
FIG. 9 is a diagram illustrating a configuration example of a fixed station according to a fourth embodiment.

The fourth embodiment is a mode in which, in the configuration of the second embodiment, the fixed station 200 measures the delay time and notifies the mobile 100 of the measured delay time. FIG. 9 is a diagram illustrating a configuration example of the fixed station 200 according to the fourth embodiment.

In the fourth embodiment, the fixed station 200 newly includes a delay time processor 251. Furthermore, the optical signal transmitter and receiver 210 includes a mechanism such as a four-divided photo detector (QPD) or a camera that can ascertain the position of the beam received from the mobile 100 sufficiently and frequently with respect to the beam movement time. As described above, the optical signal transmitter and receiver 210 in the fourth embodiment has a function as a light reception position acquirer that acquires a light reception position of a beam.

The optical signal transmitter and receiver 210 outputs the position of the beam ascertained by the four-divided photodetector, the camera, or the like to the delay time processor 251. As a result, the delay time processor 251 can ascertain the movement of the mobile 100 such as whether the mobile 100 has started to move or has ended to move. That is, the delay time processor 251 detects the start of movement of the mobile 100 from the light reception position.

In addition, the instruction receiver 221 in FIG. 9 outputs a movement instruction to the delay time processor 251. As a result, the delay time processor 251 acquires the delay time from the reception of the movement instruction to the detection of the start of movement. Specifically, the delay time processor 251 acquires the time at which the movement instruction is output from the GPS/RTC 225. The delay time processor 251 can measure the delay time from the time elapsed from the timing at which the movement instruction is output to the start of movement. The delay time processor 251 notifies the mobile 100 of the measured delay time.

Figure 10:
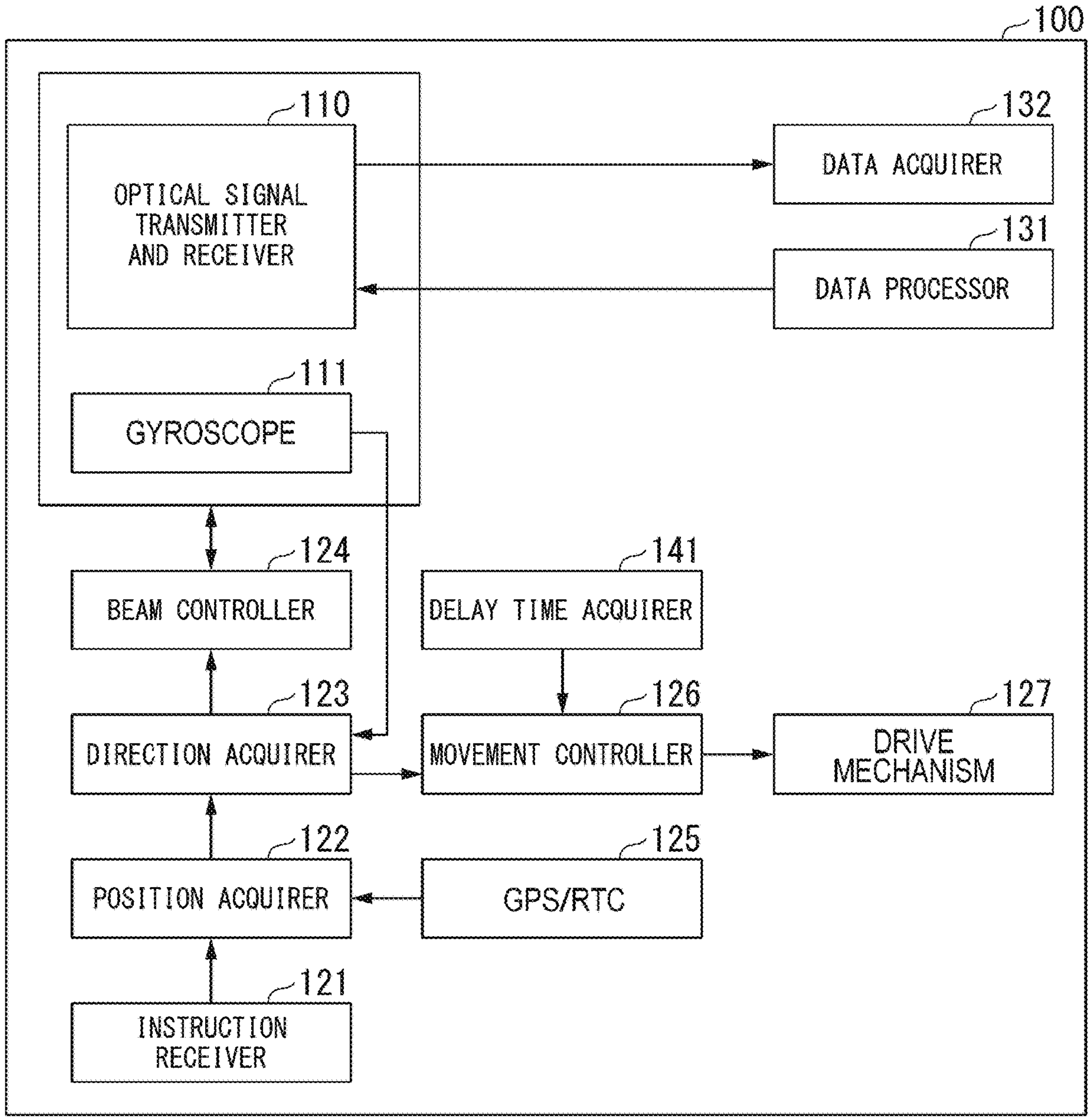
FIG. 10 is a diagram illustrating a configuration example of a mobile according to the fourth embodiment.

FIG. 10 is a diagram illustrating a configuration example of the mobile 100 in the fourth embodiment. In the fourth embodiment, the mobile 100 newly includes a delay time acquirer 141. The delay time acquirer 141 corresponds to a detector, a delay time acquirer, and a delay time notifier.

Figure 11:
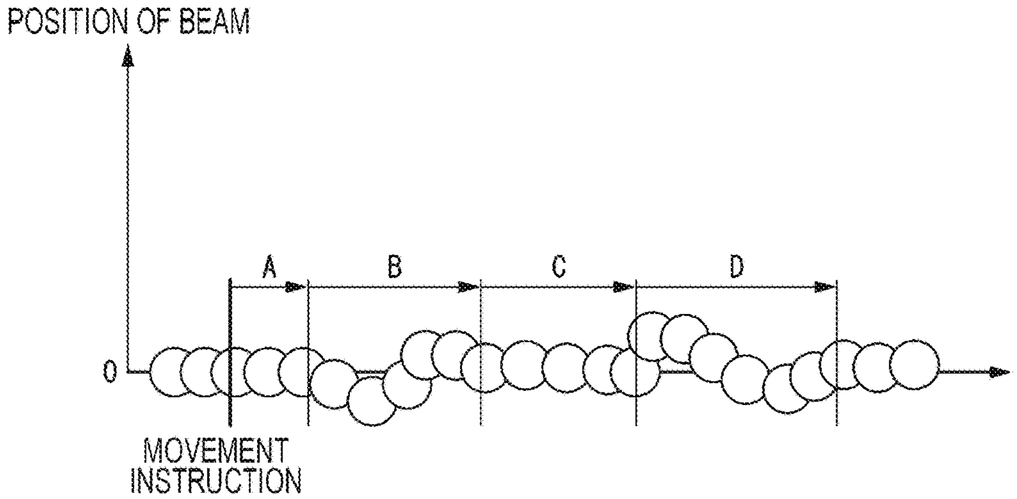
FIG. 11 is a diagram for illustrating a method of measuring a delay time by the fixed station.
Figure 12A:
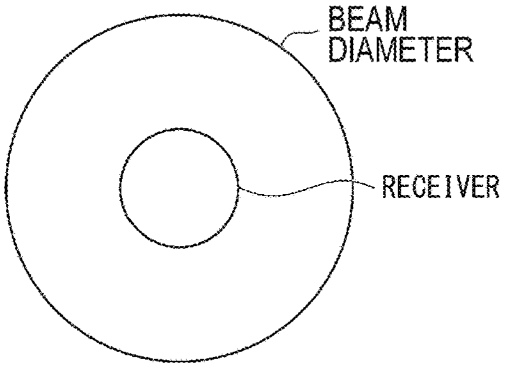
FIG. 12A is a diagram illustrating a technique in the related art.
Figure 12B:
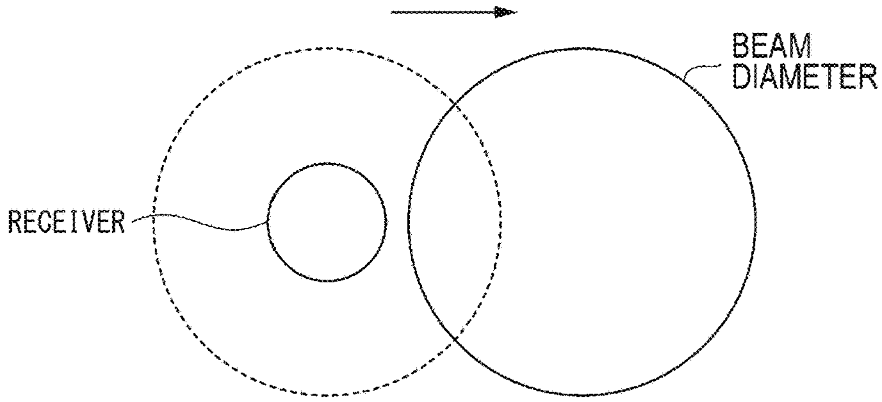
FIG. 12B is a diagram illustrating a technique in the related art.
Figure 12C:
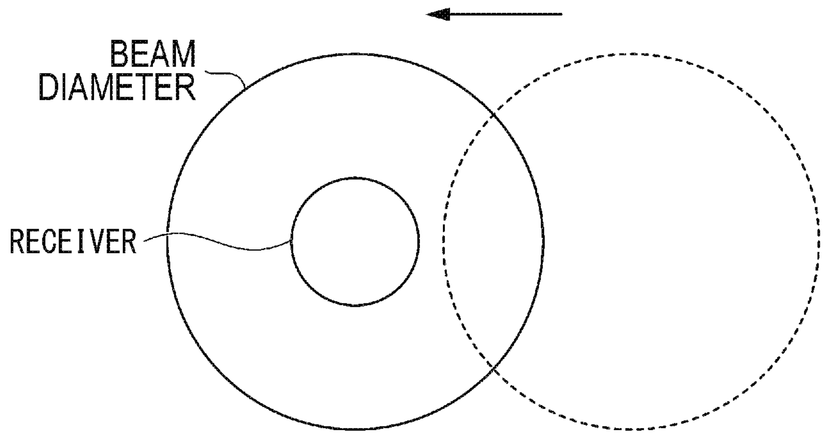
FIG. 12C is a diagram illustrating a technique in the related art.
Figure 13A:
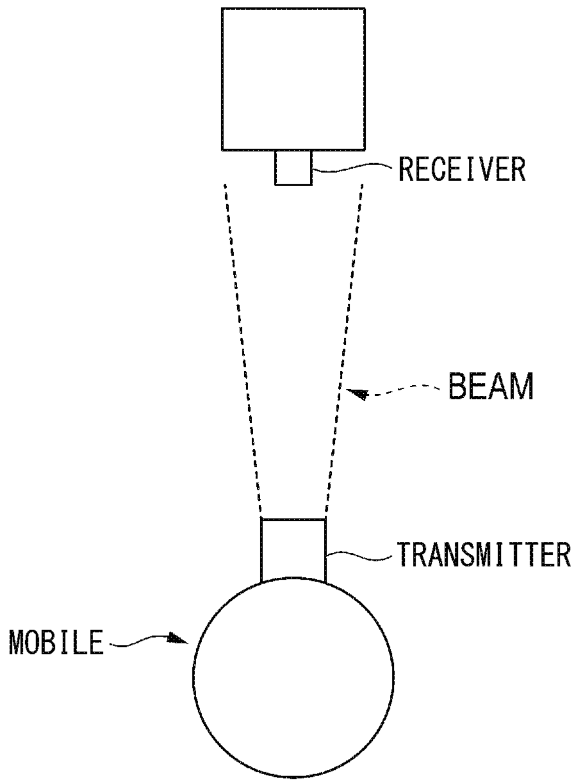
FIG. 13A is a diagram illustrating a technique in the related art.
Figure 13B:
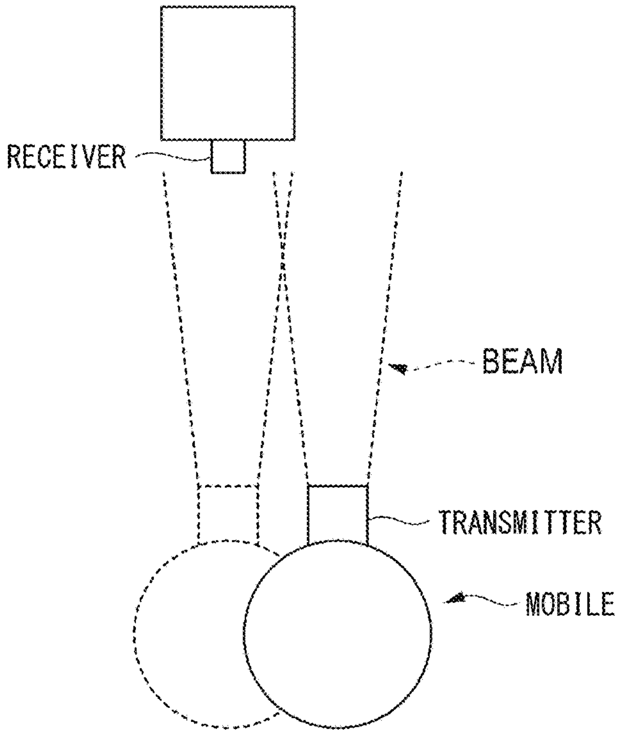
FIG. 13B is a diagram illustrating a technique in the related art.
Figure 13C:
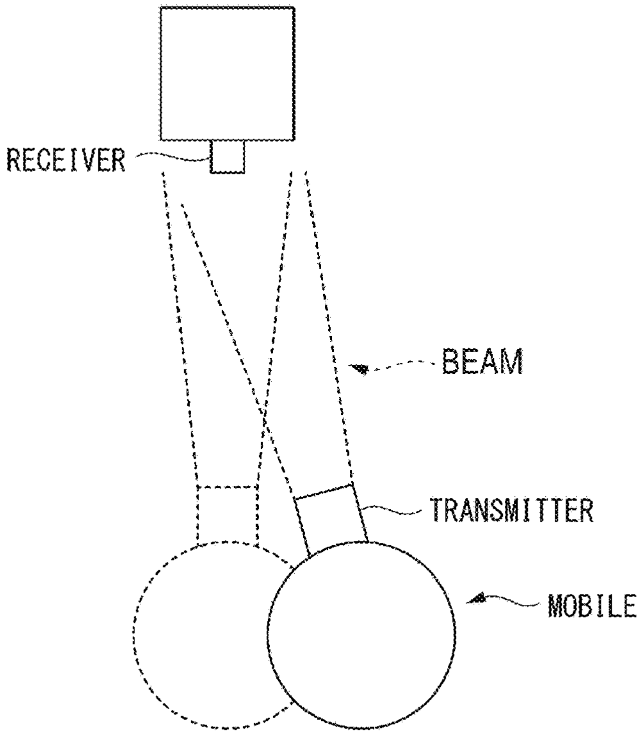
FIG. 13C is a diagram illustrating a technique in the related art.

FIG. 11 is a diagram for illustrating a method of measuring a delay time by the fixed station 200. The vertical axis indicates the position of the received beam. A beam position of "0" indicates a reference position (for example, the center of the light receiver), and the other positions are deviated from the reference position. The horizontal axis represents time.

A section A is a section starting from the timing when the movement instruction is received from the flight control device 300. In this section A, since there is no change in the position of the beam, the time in this section corresponds to the delay time. A section B corresponds to a time required for motion convergence at the start of movement of the mobile 100. A section C corresponds to a time during which the mobile 100 is stably tracked during the movement. A section D corresponds to a time required for movement convergence at the end of movement.

As described above, the delay time processor 251 notifies the delay time acquirer 141 of the mobile 100 of the time in the section A as the delay time. In actual operation, the mobile 100 may perform movement a plurality of times, and one delay time (for example, an average delay time) may be determined using a plurality of delay times obtained as a result. In addition, an upper limit of the number of movements may be determined, and the movement may be performed until the delay time converges within the upper limit.

Note that a value obtained by taking a cross-correlation between the relationship between the magnitude of deviation from the position "0" and the time when the mobile 100 moves according to the movement route obtained from the current position and the movement destination from the movement instruction and the relationship between the magnitude of actually measured deviation and the time may be used as the operation delay time. In addition, since the undershoot and the overshoot in the tracking control at the start of movement of the mobile 100 can also be known, the fixed station 200 may adjust the tracking operation on the fixed station side so as to reduce the sizes thereof.

According to the fourth embodiment, since the delay time more suitable for the actual environment can be obtained, it does not take a wasteful long time or it is not possible to perform tracking due to being too short, and thus, it is possible to perform more precise change control.

As above, the embodiments of the present invention have been described in detail with reference to the drawings. On the other hand, the specific configuration is not limited to the embodiments, and includes design and the like without departing from the spirit of the present invention.

INDUSTRIAL APPLICABILITY

The present invention is applicable to an optical spatial communication system.

REFERENCE SIGNS LIST

10 Communication system
100 Mobile
110 Optical signal transmitter and receiver
111 Gyroscope
121 Instruction receiver

122 Position acquirer
123 Direction acquirer
124 Beam controller
126 Movement controller
127 Drive mechanism
131 Data processor
132 Data acquirer
141 Delay time acquirer
200 Fixed station
210 Optical signal transmitter and receiver
211 Gyroscope
221 Instruction receiver
224 Light reception controller
231 Data processor
232 Data acquirer
241 Mobile position acquirer
242 Speed measurer
251 Delay time processor
300 Flight control device
310 Instruction transmitter
320 Data acquisition controller

The invention claimed is:

1. A mobile comprising:
an optical transmitter that transmits an optical signal by irradiating a light receiver of a reception device with a beam;
an instruction receiver that receives a movement instruction to move the mobile to a designated position;
a position acquirer that acquires a current position of the mobile;
a direction acquirer that acquires a moving direction from the current position to the designated position; and
a beam controller that
performs change control of changing an irradiation direction of a beam according to the moving direction within a range in which the light receiver is irradiated with the beam before the mobile starts to move toward the designated position,
acquires an irradiation position of the beam irradiated by the optical transmitter after the mobile starts to move toward the destinated position, and
performs tracking control to cause the light receiver of the reception device to be irradiated with the beam.

2. The mobile according to claim 1, further comprising:
a movement controller that moves the mobile toward the designated position, wherein
the movement controller moves the mobile toward the designated position after a predetermined delay time has elapsed since the change control is started.

3. The mobile according to claim 1, wherein the beam controller changes an irradiation direction in a direction opposite to the moving direction within a range in which the light receiver is irradiated with a beam.

4. A communication system comprising: a mobile; and a reception device that receives a beam emitted from the mobile, wherein
the mobile comprises
an optical transmitter that transmits an optical signal by irradiating a light receiver of the reception device with a beam,
a first instruction receiver that receives a movement instruction to move the mobile to a designated position,
a first position acquirer that acquires a current position of the mobile,
a first direction acquirer that acquires a moving direction from the current position to the designated position, and
a beam controller that
performs change control of changing an irradiation direction of a beam according to the moving direction acquired by the first direction acquirer within a range in which the light receiver is irradiated with the beam before the mobile starts to move toward the designated position,
acquires an irradiation position of the beam irradiated by the optical transmitter after the mobile starts to move toward the destinated position, and
performs tracking control to cause the light receiver of the reception device to be irradiated with the beam, and
the reception device comprises
a second instruction receiver that receives the movement instruction, and
a light reception controller that performs change control of changing an orientation direction of the light receiver according to the movement instruction received by the second instruction receiver.

5. The communication system according to claim 4, wherein
the mobile comprises a movement controller that moves the mobile toward the designated position, and
the movement controller moves the mobile toward the designated position after a predetermined delay time has elapsed since the change control is started.

6. The communication system according to claim 4, wherein
the reception device comprises
a current position acquirer that acquires a current position of the mobile a plurality of times, and
a measurer that measures a moving speed of the mobile from a current position acquired a plurality of times by the current position acquirer, and
the light reception controller performs change control to change an orientation direction of the light receiver based on a moving speed measured by the measurer.

7. The communication system according to claim 4, wherein
the reception device comprises
a light reception position acquirer that acquires a light reception position of the beam,
a detector that detects a start of movement of the mobile from the light reception position acquired by the light reception position acquirer,
a delay time acquirer that acquires a delay time from when the second instruction receiver receives the movement instruction to when the detector detects the start of movement, and
a delay time notifier that notifies the mobile of the delay time acquired by the delay time acquirer.

8. A control method of a mobile comprising an optical transmitter that transmits an optical signal by irradiating a light receiver of a reception device that receives a beam irradiated from the mobile with a beam, the method comprising:
receiving a movement instruction to move the mobile to a designated position;
acquiring a current position of the mobile;
acquiring a moving direction from the current position to the designated position; and
performing change control of changing an irradiation direction of a beam according to the moving direction within a range in which the light receiver is irradiated with the beam before the mobile starts to move toward the designated position acquiring an irradiation position of the beam irradiated by the optical transmitter after the mobile starts to move toward the destinated position; and performing tracking control to cause the light receiver of the reception device to be irradiated with the beam.

9. The mobile according to claim 2, wherein the beam controller changes an irradiation direction in a direction opposite to the moving direction within a range in which the light receiver is irradiated with a beam.

* * * * *